United States Patent
Prabhala et al.

(10) Patent No.: US 10,837,330 B2
(45) Date of Patent: Nov. 17, 2020

(54) LIQUID FILTER FUEL CONSUMPTION ESTIMATION

(71) Applicant: Cummins Filtration IP, Inc., Columbus, IN (US)

(72) Inventors: Bharadwaj R. Prabhala, Columbus, IN (US); Jeffery Massey, Judsonia, AR (US); Abhijeet Vaidya, Columbus, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 16/342,040

(22) PCT Filed: Oct. 13, 2017

(86) PCT No.: PCT/US2017/056544
§ 371 (c)(1),
(2) Date: Apr. 15, 2019

(87) PCT Pub. No.: WO2018/075354
PCT Pub. Date: Apr. 26, 2018

(65) Prior Publication Data
US 2019/0249578 A1    Aug. 15, 2019

Related U.S. Application Data

(60) Provisional application No. 62/410,104, filed on Oct. 19, 2016.

(51) Int. Cl.
*F01M 11/10* (2006.01)
*F02D 41/22* (2006.01)
(Continued)

(52) U.S. Cl.
CPC .............. *F01M 11/10* (2013.01); *F01M 1/10* (2013.01); *F02D 41/22* (2013.01); *F16N 39/06* (2013.01);
(Continued)

(58) Field of Classification Search
CPC .. F01M 11/10; F01M 1/10; F01M 2001/1007; F16N 39/06; F16N 2260/30;
(Continued)

(56) References Cited

U.S. PATENT DOCUMENTS 8,534,123 B2    9/2013    Herman et al.
9,061,224 B2    6/2015    Verdegan et al.
(Continued)

FOREIGN PATENT DOCUMENTS

WO    WO 2011/156609    12/2011

OTHER PUBLICATIONS

International Search Report and Written Opinion issued for PCT/US2017/056544, dated Feb. 13, 2018, 16 pages.
(Continued)

*Primary Examiner* — Xiao En Mo
(74) *Attorney, Agent, or Firm* — Foley & Lardner LLP

(57) ABSTRACT

A system and method for monitoring the negative impact of a filtration system on the fuel economy of an internal combustion engine. A filter monitoring controller receives engine operating parameters of the internal combustion engine. The filter monitoring controller determines an amount of power generated by the internal combustion engine based at least in part on the engine operating parameters. The filter monitoring controller determines a filter hydraulic power consumption of a filtration system providing a fluid to the internal combustion engine. The filter monitoring controller determines a fuel economy impact of the filtration system on the internal combustion engine based
(Continued)

at least in part on the filter hydraulic power consumption of the filtration system. The filter monitoring controller compares the fuel economy impact of the filtration system to a threshold fuel economy impact to determine whether a filter element of the filtration system requires servicing.

21 Claims, 5 Drawing Sheets

(51) Int. Cl.
    *F01M 1/10*     (2006.01)
    *F16N 39/06*     (2006.01)
    *B01D 35/143*     (2006.01)

(52) U.S. Cl.
    CPC . *B01D 35/1435* (2013.01); *F01M 2001/1007* (2013.01); *F02D 2041/224* (2013.01); *F02D 2041/228* (2013.01); *F02D 2200/024* (2013.01); *F02D 2200/0625* (2013.01); *F02D 2200/1004* (2013.01); *F02D 2200/1006* (2013.01); *F16N 2260/30* (2013.01)

(58) Field of Classification Search
CPC ............. F02D 41/22; F02D 2200/1004; F02D 2041/224; F02D 2041/228; F02D 2200/024; F02D 2200/0625; F02D 2200/1006; B01D 35/1435
See application file for complete search history.

(56) References Cited

U.S. PATENT DOCUMENTS

| | | |
|---|---|---|
| 2011/0307160 A1 | 12/2011 | Verdegan et al. |
| 2011/0308308 A1 | 12/2011 | Herman et al. |
| 2015/0361840 A1 | 12/2015 | Verdegan et al. |
| 2016/0046503 A1 | 2/2016 | Hoek et al. |
| 2016/0273471 A1 | 9/2016 | Shimpi et al. |

OTHER PUBLICATIONS

Office Action cited for Indian Patent Application No. 201947018481, dated Aug. 28, 2020, 6 pages.

LIQUID FILTER FUEL CONSUMPTION ESTIMATION

CROSS REFERENCE TO RELATED APPLICATIONS

This application is a national stage of PCT Application No. PCT/US2017/056544, filed Oct. 13, 2017 which claims the benefit of priority to U.S. Provisional Application No. 62/410,104, filed Oct. 19, 2016. The contents of both applications are incorporated herein by reference in their entirety.

TECHNICAL FIELD

The present application relates to filtration systems.

BACKGROUND

Internal combustion engines generally combust a mixture of fuel (e.g., gasoline, diesel, natural gas, etc.) and air. Many or all of the fluids passing through the internal combustion engine are filtered to remove particulate and contaminants from the fluids prior to entering the internal combustion engine. For example, prior to entering the engine, fuel to be combusted is typically passed through a filter element to remove contaminants (e.g., particulates, dust, water, etc.) from the fuel prior to delivery to the engine. The filter media of the filter element captures and removes particulate from the fuel passing through the filter media. As the filter media captures and removes particulate, the restriction of the filter media increases thereby causing an increase in the pressure drop across the filtration system. Accordingly, the fuel pump may need to work harder to pump the appropriate amount of fuel through the filtration system. Thus, the pressure drop across the fuel filtration system may negatively impact the fuel economy of the internal combustion engine.

SUMMARY

Various example embodiments relate to systems and methods for monitoring the negative impact of a filtration system on the fuel economy of an internal combustion engine. One such embodiment relates to a method. The method includes receiving, by a filter monitoring controller, engine operating parameters of an internal combustion engine. The method further includes determining, by the filter monitoring controller, an amount of power generated by the internal combustion engine based at least in part on the engine operating parameters. The method includes determining, by the filter monitoring controller, a filter hydraulic power consumption of a filtration system providing a fluid to the internal combustion engine. The method further includes determining, by the filter monitoring controller, a fuel economy impact of the filtration system on the internal combustion engine based at least in part on the filter hydraulic power consumption of the filtration system. The method includes comparing, by the filter monitoring controller, the fuel economy impact of the filtration system to a threshold fuel economy impact to determine whether a filter element of the filtration system requires servicing.

Another embodiment relates to a filtration system. The filtration system includes a lubrication system, a fuel delivery system, and a filter monitoring controller. The lubrication system includes a lubricant pump, a lubricant sump, and a lubricant filtration system. The lubrication system is configured to circulate a lubricant to and from an internal combustion engine. The lubricant sump is configured to store lubricant not being circulated through the lubrication system. The lubricant filtration system includes a lubricant filter element structured to remove contaminants from the lubricant upstream of the internal combustion engine. The fuel delivery system is configured to deliver fuel to the internal combustion engine. The fuel delivery system includes a fuel pump, a fuel tank, and a fuel filtration system. The fuel tank is configured to store fuel to be combusted by the internal combustion engine. The fuel filtration system includes a fuel filter element structured to remove contaminants from the fuel upstream of the internal combustion engine. The filter monitoring controller is configured to receive engine operating parameters of the internal combustion engine, determine an amount of power generated by the internal combustion engine based at least in part on the engine operating parameters, determine a filter hydraulic power consumption of the fuel filtration system providing fuel to the internal combustion engine, determine a fuel economy impact of the fuel filtration system on the internal combustion engine based at least in part on the filter hydraulic power consumption of the fuel filtration system, and compare the fuel economy impact of the fuel filtration system to a threshold fuel economy impact to determine whether the fuel filter element requires servicing.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, systems and methods for determining the effect that a fluid filtration system (e.g., a fuel filtration system, a lubricant filtration system, a hydraulic filtration system, etc.) is having on the fuel consumption or fuel economy of an internal combustion engine are described. The fuel consumption or fuel economy impact of the filtration system is estimated based at least in part on information from an engine control module ("ECM") of the internal combustion engine (e.g., engine speed, engine torque, engine power, throttle position, etc.) and information relating to the filtration system. The fuel consumption or fuel economy impact of the filtration system may be used by the operator of the internal combustion engine in determining whether the filtration system requires servicing (e.g., filter element replacement).

Figure 1:
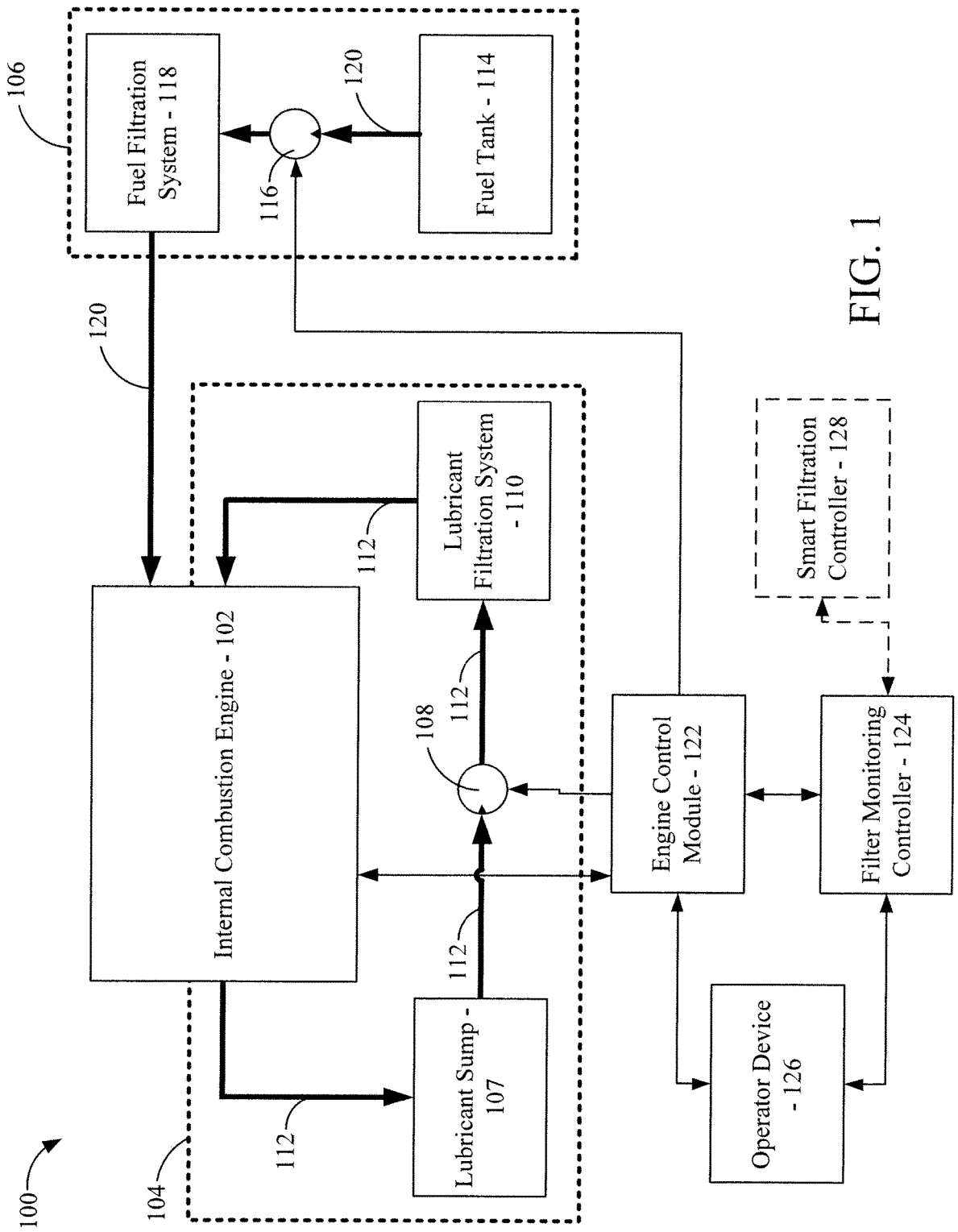
FIG. 1 shows a schematic view of a system according to an example embodiment.

Referring to FIG. 1, a schematic view of a system 100 is shown according to an example embodiment. The system 100 may correspond to a vehicle, a piece of construction equipment, a generator, or the like. The system 100 is powered by an internal combustion engine 102. The internal combustion engine 102 may be, for example, a diesel internal combustion engine, a gasoline internal combustion engine, a natural gas internal combustion engine, a turbine-powered engine, a biodiesel-powered engine, an ethanol engine, a liquid petroleum gas ("LPG") engine, or the like. The system 100 is shown as including two different liquid delivery or circulation systems having associated filtration systems: a lubrication system 104 and a fuel delivery system 106.

The lubrication system 104 includes a lubricant sump 107, a lubricant pump 108, and a lubricant filtration system 110. The lubrication system 104 circulates a lubricant (e.g., engine oil) to and from the internal combustion engine 102 via a series of conduits 112 in the manner shown in FIG. 1. Although the lubricant pump 108 is shown as being upstream of the lubricant filtration system 110 in the lubricant flow direction, the lubricant pump 108 can be positioned downstream of the lubricant filtration system 110 in other arrangements. The lubricant sump 107 is a storage reservoir (e.g., a tank) that stores lubricant not being circulated through the lubrication system 104. The lubricant filtration system 110 includes a lubricant filter element structured to remove contaminants (e.g., water, dust, debris, etc.) from the lubricant upstream of the internal combustion engine 102 in the lubricant flow direction.

Similarly, the fuel delivery system 106 includes a fuel tank 114, a fuel pump 116, and a fuel filtration system 118. In some arrangements, the fuel delivery system 106 also includes fuel injectors. The fuel delivery system 106 delivers fuel from the fuel tank 114 to the internal combustion engine 102 via a series of conduits 120. Although the fuel pump 116 is shown as being upstream of the fuel filtration system 118 in the fuel flow direction, the fuel pump 116 can be positioned downstream of the fuel filtration system 118 in other arrangements. The fuel tank 114 is a storage reservoir (e.g., a tank) that stores fuel to be combusted by the internal combustion engine 102. The fuel filtration system 118 includes a fuel filter element structured to remove contaminants (e.g., water, dust, debris, etc.) from the fuel upstream of the internal combustion engine 102 in the fuel flow direction.

The system 100 includes an engine control module 122. Generally, the engine control module 122 is structured to control the operation of the internal combustion engine 102 and the operation of the lubricant pump 108 and fuel pump 116. In an alternate arrangement, the operation of the lubricant pump 108 and the fuel pump 116 are controlled by an independent controller that does not also control the operation of the internal combustion engine 102, but may receive engine operating parameters from a dedicated ECM via a data link (e.g., a J1939 vehicle bus data link). The engine control module 122 receives and/or generates real-time engine operating parameter information associated with the internal combustion engine 102. The engine operating parameter information may include, for example, engine duty cycle, engine fuel information, engine odometer, engine rifle temperature, engine speed, exhaust parameters, turbocharger parameters, and the like. The engine operating parameters may be provided to a filter monitoring controller 124 and/or to an operator device 126 via a data link (e.g., a J1939 vehicle bus data link). Based on at least in part on the engine operating parameter information, the engine control module 122 controls the speed of the lubricant pump 108 and the fuel pump 116 to deliver the appropriate amount of lubricant and fuel to the internal combustion engine 102.

The system 100 includes a filter monitoring controller 124. In some arrangements, the filter monitoring controller 124 is integrated into the engine control module 122. The filter monitoring controller 124 is structured to determine an amount of negative impact that a given filtration system (e.g., the lubricant filtration system 110, the fuel filtration system 118, etc.) is having on fuel consumption of the internal combustion engine 102. If a given filtration system is having too large of a negative impact on the fuel consumption the filter monitoring controller 124 can trigger a warning or other indication to an operator device 126 that the filtration system requires servicing (e.g., filter element replacement, cleaning, etc.). For example, fuel pump 116 draws power from the internal combustion engine—either directly (e.g., a belt-driven pump) or indirectly (e.g., a pump that receives electric power from an alternator that is powered by the internal combustion engine 102). As the fuel filter of the fuel filtration system 118 clogs, the restriction across the fuel filtration system 118 increases, and the pump requires more power to pump fuel through the fuel filtration system 118. Consequently, the pump draws more power from the internal combustion engine 102 thereby reducing fuel economy of the internal combustion engine 102. As described in further detail below, the filter monitoring controller 124 uses information about the internal combustion engine 102 (e.g., engine type, engine efficiency, fuel type, fuel economy, etc.), filtration pump efficiencies, engine operating parameters (as received from the engine control module 122), and the filtration system feedback (e.g., pressure drop sensor feedback, liquid viscosity feedback, liquid temperature feedback, etc.) as inputs into algorithms for determining hydraulic fluid power to quantify the fuel consumption impact of a given filtration system. Once this calculation is completed, the fuel economy impact estimation can be compared to a preset threshold or other metric (e.g., an operator-defined metric) from which a decision can be made as to whether the filtration system needs to be serviced. Accordingly, the filtration system service indication is based on fuel consumption penalties rather than only filter differential pressure. This allows for a system maintenance decision to be made based on actual monetary cost of running the internal combustion engine 102 at real-time operating conditions and current internal combustion engine duty cycle information.

Still referring to FIG. 1, the system 100 includes an operator device 126. The filter monitoring controller 124 and/or the engine control module 122 can provide real-time feedback to the operator device 126. The operator device 126 may be any of a vehicle dashboard or display (such as a liquid crystal display or active matrix display), a smartphone, a remote diagnostics center, or the like. The real-time feedback may relate to engine operating parameters, filtration system statuses, filter change notifications, and the like. In other arrangements, the operator device 126 may be a remote telematics service device (e.g., a remote server) associated with an operator of the internal combustion engine 102 (or equipment powered by the internal combustion engine 102). In such arrangements, the operator device 126 may be communicated with via a cellular data connection between the filter monitoring controller 124 and/or the engine control module 122 and the operator device 126 facilitated via the Internet.

In some arrangements, the system 100 includes a smart filtration controller 128 of a smart filtration system. The smart filtration controller 128 receives feedback from sensors associated with the various filtration systems (e.g., the lubricant filtration system 110, the fuel filtration system 118, an air filtration system, etc.) that provide fluids to the internal combustion engine 102. For example, the smart filtration controller 128 may receive feedback signals from viscosity sensors, fluid flow rate sensors, pressure sensors, pressure differential sensors, temperature sensors, dielectric sensors, contaminant sensors, water-in-fuel/oil sensors, and the like. The smart filtration controller 128 may use the collected filtration system information to determine when a filter element of a filtration system should be serviced or changed. The smart filtration controller 128 can provide real-time feedback relating to any of the monitored conditions or characteristics of the filtration systems to the filter monitoring controller 124 as described in further detail below.

Figure 2:
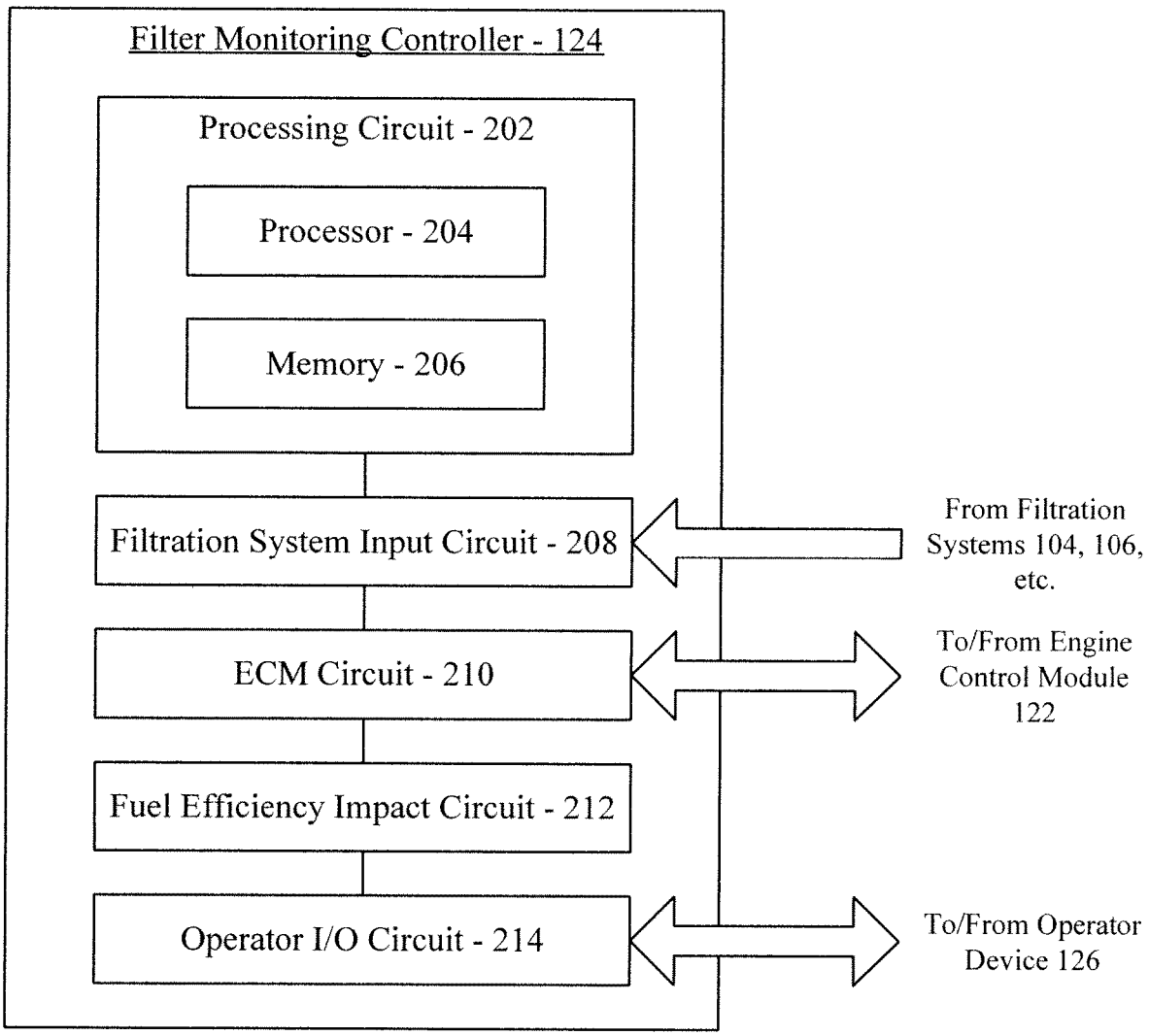
FIG. 2 shows a block diagram of a filter monitoring controller of the system of FIG. 1.

Referring to FIG. 2, a block diagram of the filter monitoring controller 124 is shown. The controller includes a processing circuit 202. The processing circuit 202 includes a processor 204 and memory 206. The processor 204 may be a general-purpose processor, an application specific integrated circuit (ASIC), a programmable logic controller (PLC) ship, one or more field programmable gate arrays (FPGAs), a digital signal processor (DSP), a group of processing components, or other suitable electronic processing components. The memory 206 may include any of RAM, NVRAM, ROM, Flash Memory, hard disk storage, or the like. The processor 204 is structured to execute instructions stored in the memory 206 that cause the processor 204 to control the operation of the filter monitoring controller 124. In some arrangements, the memory 206 may also include one or more storage devices (e.g., hard drives, flash drives, computer readable media, etc.) either local or remote from the filter monitoring controller 124. The memory 206 can be configured to store look up tables, algorithms or instructions. Such algorithms can include, for example data filtering, temperature conditioning and correcting, numerical methods, decision making algorithms which processes a certain number of successive input data to calculate the desired output.

The filter monitoring controller 124 includes a filtration system input circuit 208, an ECM circuit 210, a fuel efficiency impact circuit 212, and an operator input-output circuit 214. In some arrangements, each of the filtration system input circuit 208, the ECM circuit 210, the fuel efficiency impact circuit 212, and the operator input-output circuit 214 are separate from the processing circuit 202 (e.g., as shown in FIG. 2). In other arrangements, the processing circuit 202 includes any or all of the filtration system input circuit 208, the ECM circuit 210, the fuel efficiency impact circuit 212, and the operator input-output circuit 214.

The filtration system input circuit 208 is structured to receive feedback signals from the various sensors associated with the filtration systems that provide filtered fluids to the internal combustion engine 102 or other components powered by the internal combustion engine 102, including the lubricant filtration system 110 and the fuel filtration system 118. For example, the feedback signals may relate to pressure drop across a filter element of a filtration system, the viscosity of the fluid flowing through the filtration system, the temperature of the fluid flowing through the filtration system, information relating to the type of filter element installed in the filtration system, and the like.

The ECM circuit 210 is structured to communicate information to and from the engine control module 122. Accordingly, through the ECM circuit 210, the internal combustion engine 102 can provide a real-time feedback signal relating to engine operating parameters (e.g., speed, temperature, oil pressure, lubricant pump 108 speed, lubricant pump 108 power draw, fuel pump 116 speed, fuel pump 116 power draw, etc.) to the filter monitoring controller 124 via the engine control module 122. The real-time feedback of the engine operating parameters may occur via a datalink (e.g., a CANBUS link, a J1939 vehicle bus data link, etc.) with the engine control module 122 via the ECM circuit 210. Additionally, via the ECM circuit 210, the filter monitoring controller 124 can send messages to the engine control module 122 (e.g., to trigger a dashboard warning, to trigger an alarm, to shut off the internal combustion engine 102, to derate the internal combustion engine 102, etc.). In arrangements where the filter monitoring controller 124 is part of the engine control module 122, the ECM circuit may be structured control the operation of the internal combustion engine 102.

The operator input-output circuit 214 is structured to send information (e.g., real-time feedback of engine operating parameters, filtration system status, filter element change indicators, etc.) to the operator device 126. Additionally, the operator input-output circuit 214 is structured to receive information from the operator device 126. The information may relate to key on/off situations (e.g., for turning on and off the internal combustion engine 102), service information (e.g., filter element change information, fluid information, service reset commands, etc.), and the like. The operator input-output circuit 214 may comprise a transceiver (wired or wireless) configured to transmit data to external devices (e.g., the operator device 126, a remote telematics system, a vehicle dashboard, etc.). For example, the filter monitoring controller 124 can light up an indication lamp (e.g., a dashboard light) via the operator input-output circuit 214.

The fuel efficiency impact circuit 212 is structured to monitor the lubrication system 104 and the fuel delivery system 106 to determine when the lubricant filtration system 110 and/or the fuel filtration system 118 require servicing (e.g., filter element changing) due to excessive negative impact on the fuel efficiency of the internal combustion engine 102. Specifically, the fuel efficiency impact circuit 212 leverages the information received from the filtration system input circuit 208, the ECM circuit 210, and/or the operator input-output circuit 214 to determine if either the lubricant pump 108 or the fuel pump 116 are consuming beyond a threshold amount of power from the internal combustion engine 102. The specific operation of the fuel efficiency impact circuit 212 is described in further detail below with respect to Equations 1-8 and FIG. 3.

Generally, the filter monitoring controller 124 determines the negative impact of a given filtration system on the fuel efficiency of the internal combustion engine 102 based on information received from the engine control module 122, filtration system sensor feedback, and known or estimated component performance metrics. Applying the first law of thermodynamics to the internal combustion engine 102, the energy balance for engine brake power including engine losses is defined by Equation 1.

$$\dot{W}_b = \dot{W}_{i,n} - \dot{W}_{rf} - \dot{W}_a \qquad (1)$$

In Equation 1, $\dot{W}_b$ refers to brake power of the internal combustion engine 102 (shaft output), $\dot{W}_{i,n}$ refers to the net indicated power of the internal combustion engine 102 (as obtained from combustion analysis), $\dot{W}_{rf}$ refers to the rubbing friction power associated with piston and crank friction of the internal combustion engine 102, and $\dot{W}_a$ refers to the amount of power required to power accessories that receive operating power from the internal combustion engine 102. The accessories include any pumps that drive the associated filtration systems of the internal combustion engine 102 (e.g., lubricant pump 108, fuel pump 116, etc.).

The filter power consumption of a given filtration system is manifested in the associated pump that drives fluid through the filter. The shaft power required ($\dot{W}_{a,pump}$) to drive the pump can be calculated based upon the pump hydraulic power ($\dot{W}_p$) and overall pump efficiency ($\eta_p$) as defined in Equation 2. The overall pump efficiency may be a known parameter of the pump (e.g., received from the pump manufacturer).

$$\dot{W}_{a,pump} = \frac{\dot{W}_p}{\eta_p} \quad (2)$$

The pump hydraulic power ($\dot{W}_p$) can be calculated based on volumetric flow rate (Q) output and pump differential pressure ($dP_p$) as defined in Equation 3.

$$\dot{W}_p = QdP_p \quad (3)$$

Differential pressure for a fluid circuit in series can be expressed as a summation of the pressure losses across different components of the system. The fluid filter is one such component and therefore the contribution of the filter differential pressure ($dP_f$) to the hydraulic fluid power consumption, or filter hydraulic power ($\dot{W}_{a,filter}$), from the engine crankshaft can be found from Equation 4.

$$\dot{W}_{a,filter} = \frac{Q_f dP_f}{\eta_p} \quad (4)$$

The filter differential pressure may be obtained from a filtration system sensor that measures the differential pressure across the filter. In some arrangements, the filter differential pressure sensor is part of a larger smart filtration monitoring system. In Equation 4, $Q_f$ refers to the volumetric flow rate of fluid through the filter. Given the above results of Equations 1-4 and known parameters, Equation 5, which relies on the first law of thermodynamics, is used to estimate the percent by which the filter hydraulic power reduces the engine brake power.

$$\text{Power Reduction from Filter } (PR_{filt}) = \frac{\dot{W}_{a,filter}}{\dot{W}_b} \quad (5)$$

The power reduction defined by Equation 5 can be related to the fueling rate through the engine brake specific fuel consumption (bsfc). The engine brake specific fuel consumption is calculated from the fueling rate ($\dot{m}_f$) and $\dot{W}_b$ as set forth in Equation 6.

$$bsfc = \frac{\dot{m}_f}{\dot{W}_b} \quad (6)$$

A change in internal combustion engine 102 brake power ($\dot{W}_b$) at a constant flow rate (Q) through the filtration system will yield a new bsfc. This new bsfc can be used to quantify the change in fueling rate ($\dot{m}_f$). The algorithms set forth above in Equations 1-6 assume that under normal operating conditions, the brake power ($\dot{W}_b$) will be the commanded output of the internal combustion engine 102 and that the fueling rate will adjust to provide that commanded output power. Consequently, any change in the amount of fuel consumed by the filter losses ($PR_{filt}$) should correspond to a change in fueling rate, again assuming brake power ($\dot{W}_b$) is constant in application. Therefore the fuel consumption related to the filter ($\dot{m}_{f,filter}$) is determined by Equation 7.

$$(bsfc)(PR_{filt})\dot{W}_b = \dot{m}_{f,filter} = \dot{m}_f PR_{filt} \quad (7)$$

Defining $$\frac{\dot{m}_{f,filter}}{\dot{m}_f}$$

as the mass fraction of the fuel delivered related to the liquid filtration power consumed, this Equation 7 shows that the amount of fuel consumed by the filter losses is quantified by $PR_{filt}$. This provides an estimation of the impact the liquid filter hydraulic power consumption is having on the engine fuel consumption. As used herein, "$PR_{filt}$" is also referred to as the percent fuel economy impact (% FEI).

Figure 3:
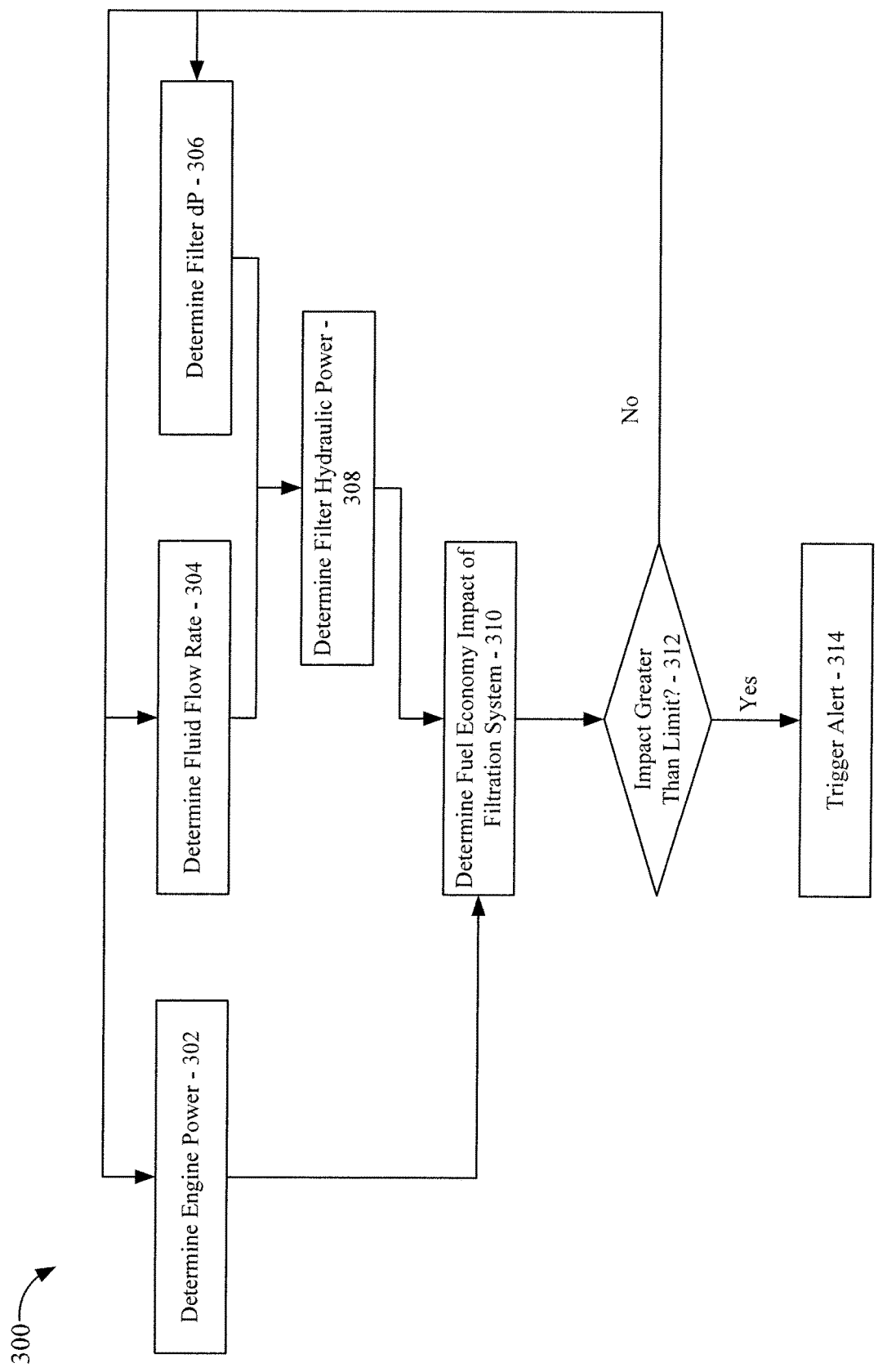
FIG. 3 shows a flow diagram of a method of monitoring a filtration system's percent fuel economy impact on the fuel economy of an internal combustion engine according to an example embodiment.

Referring to FIG. 3, a flow diagram of a method 300 of monitoring a filtration system's percent fuel economy impact on the fuel economy of the internal combustion engine 102 is shown according to an example embodiment. The method 300 is performed by the filter monitoring controller 124. In arrangements where the filter monitoring controller 124 is included in the engine control module 122, the method 300 is performed by the engine control module 122. The filtration system may correspond to the lubrication system 104, the fuel delivery system 106, or another liquid delivery system having an associated filtration system.

Generally, in the method 300, the filter monitoring controller 124 leverages Equations 1-7 to calculate the percent fuel economy impact of a given filtration system, compares the percent fuel economy impact to a threshold percent fuel economy impact, and triggers a warning if the determined percent fuel economy impact exceeds the threshold. To do so, the filter monitoring controller 124 needs to determine the internal combustion engine 102 power, the liquid pump overall efficiency associated with the pump of the filtration system, the pressure drop across the filtration system, and the fluid flow rate through the filtration system. In some arrangements, the fluid flow through filtration system is measured using a flow sensor. In other arrangements where a flow sensor is not present, the filter monitoring controller 124 can calculate the fluid flow through the filtration system based at least in part on useful engine parameters. For example, fuel flow rate can be estimated based at least in part on engine speed (e.g., engine RPM), fluid pressure, fluid temperature, fuel injection pulse rates and sizes, and the like. As another example, lubricant flow rate can be estimated based on lubricant temperature, lubricant pressure, lubricant viscosity, engine speed, and the like. In some arrangements, the pump efficiency will be a known metric that is provided to the filter monitoring controller 124 at the time of installation of the pump. In other arrangements, the pump efficiency can be calculated in real-time based on transfer functions.

The method 300 begins when the engine power is determined at 302. The filter monitoring controller 124 determines the power level of the internal combustion engine 102. The filter monitoring controller 124 collects real-time engine operating parameters from the engine control module 122. The engine operating parameters include the engine torque and engine speed. In arrangements where the monitored filtration system is the lubrication system 104, the filter monitoring controller 124 also receives the lubricant temperature (e.g., from a smart filtration system sensor temperature output). The engine net power ($\dot{W}_n$)) in kilowatt (kW) can be computed from the engine net torque (Tn), in N-m, and engine speed (N), in revolutions per minute (rpm), by Equation 8.

$$\dot{W}_n = \frac{\pi N T_n \times 10^{-3}}{30} \text{(kW)} \qquad (8)$$

The engine net power calculated in Equation 8 is used in place of $\dot{W}_b$ in Equations 1-7. For a given engine liquid pump the efficiency and flow rate will be a function of engine speed.

The fluid flow rate through the filtration system is determined at 304. In some arrangements, the filter monitoring controller 124 receives feedback from a flow rate sensor associated with the filtration system (e.g., from a smart filtration system controller). In other arrangements, fluid temperature, viscosity, and engine speed are used to determine the fluid flow rate. In such arrangements, real-time feedback from fluid temperature sensors and a viscosity sensor may be used.

The pressure drop across the filtration system is determined at 306. In some arrangements, the filter monitoring controller 124 receives feedback from a pressure drop sensor associated with the filtration system (e.g., from a smart filtration system controller). The pressure drop sensor may measure the pressure drop across just the filter element of the filtration system or across the entire filtration system. In some arrangements, the filter pressure drop is corrected to account for any large changes due to liquid thickening or thinning and allowing for estimating the amount of contaminant contributing to the filter pressure drop based on real-time feedback from fluid temperature sensors and a viscosity sensor.

The filter hydraulic power is determined at 308. The filter monitoring controller 124 determines the filter hydraulic power ($\dot{W}_p$), which corresponds to the amount of power the pump (e.g., lubricant pump 108, fuel pump 116, etc.) uses to drive fluid through the filtration system, through Equation 3.

The fuel economy impact of the filtration system is determined at 310. The filter monitoring controller 124 determines the percent fuel economy impact of the filter of the filtration system (% FEI) using Equations 4-7 as described above. As noted above, in some arrangements, the pump efficiency ($\eta_p$) may be assumed based on provided information (e.g., as provided from the pump manufacturer) or assumed to be a constant based on a typical pump efficiency (e.g., $\eta_p$=55%).

The filter monitoring controller 124 compares the calculated percent fuel economy impact of the filter against a threshold value of percent fuel economy impact of the filter at 312. The threshold value may be programmed by the operator of the internal combustion engine 102, the manufacturer of the internal combustion engine 102, the manufacturer of the monitored filter, or the like. The threshold value corresponds to a "replace condition" for the filter. Accordingly, if the calculated percent fuel economy impact of the filter exceeds the threshold, the filter monitoring controller 124 triggers a warning to a user or operator via the operator device 126 (e.g., triggers a dashboard light, sends a warning to a smartphone associated with the user or operator, sends a warning to a remote telematics center, etc.). If the calculated percent fuel economy impact of the filter does not exceed the threshold, the method 300 restarts.

Figure 4:
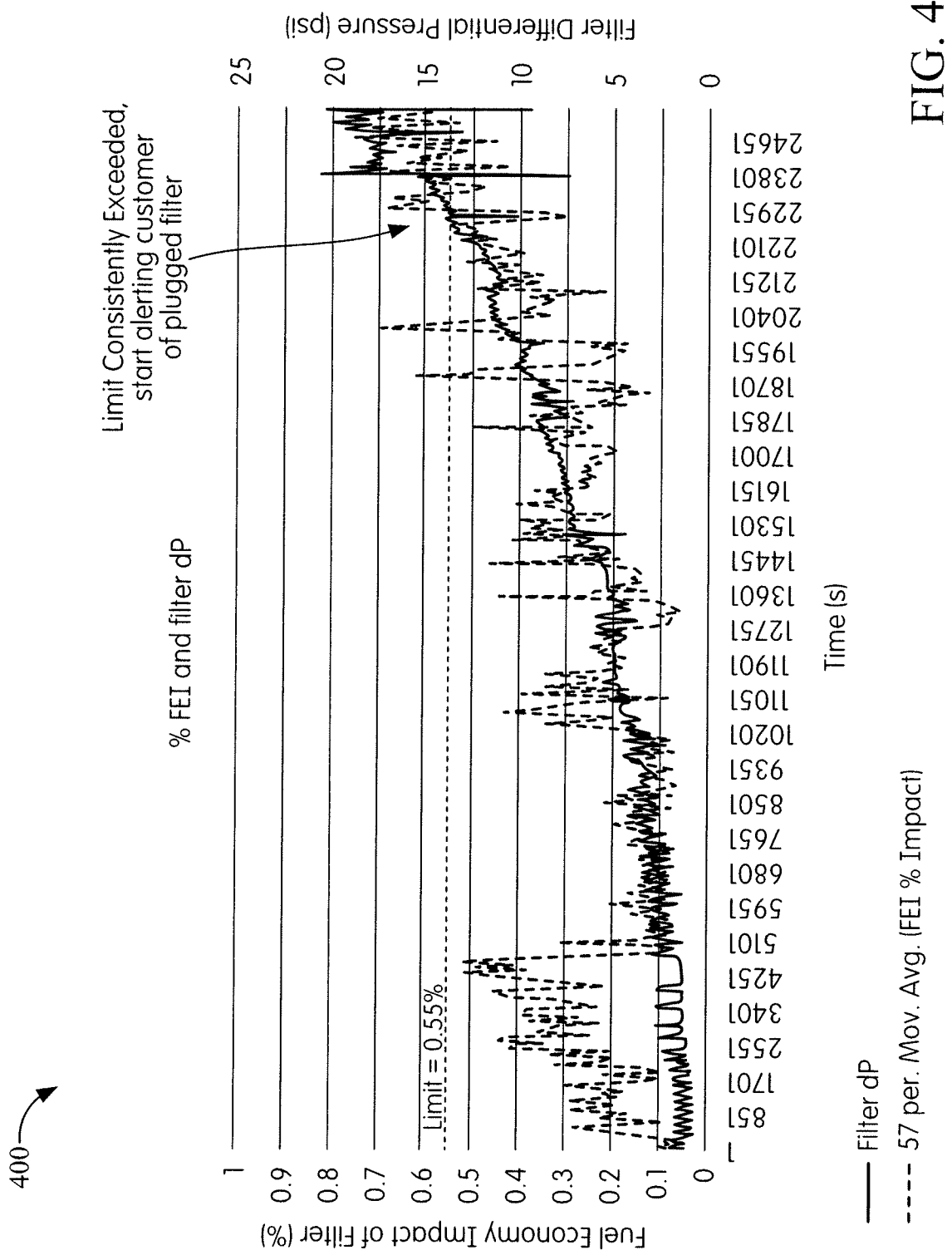
FIG. 4 shows a graph of percent fuel economy impact of a filter of a filtration system and filter differential pressure of the filtration system vs. time.

Referring to FIG. 4, a graph 400 of percent fuel economy impact of the filter of the filtration system and filter differential pressure of the filtration system vs. time is shown. As shown in the graph 400, a threshold % FEI value of 0.55% has been set. After the moving average of the FEI % impact of the filter exceeds the threshold value of 0.55%, the filter monitoring controller 124 can trigger an alert to a user or operator via the operator device 126 (as described above with respect to process 314 of the method 300).

Figure 5:
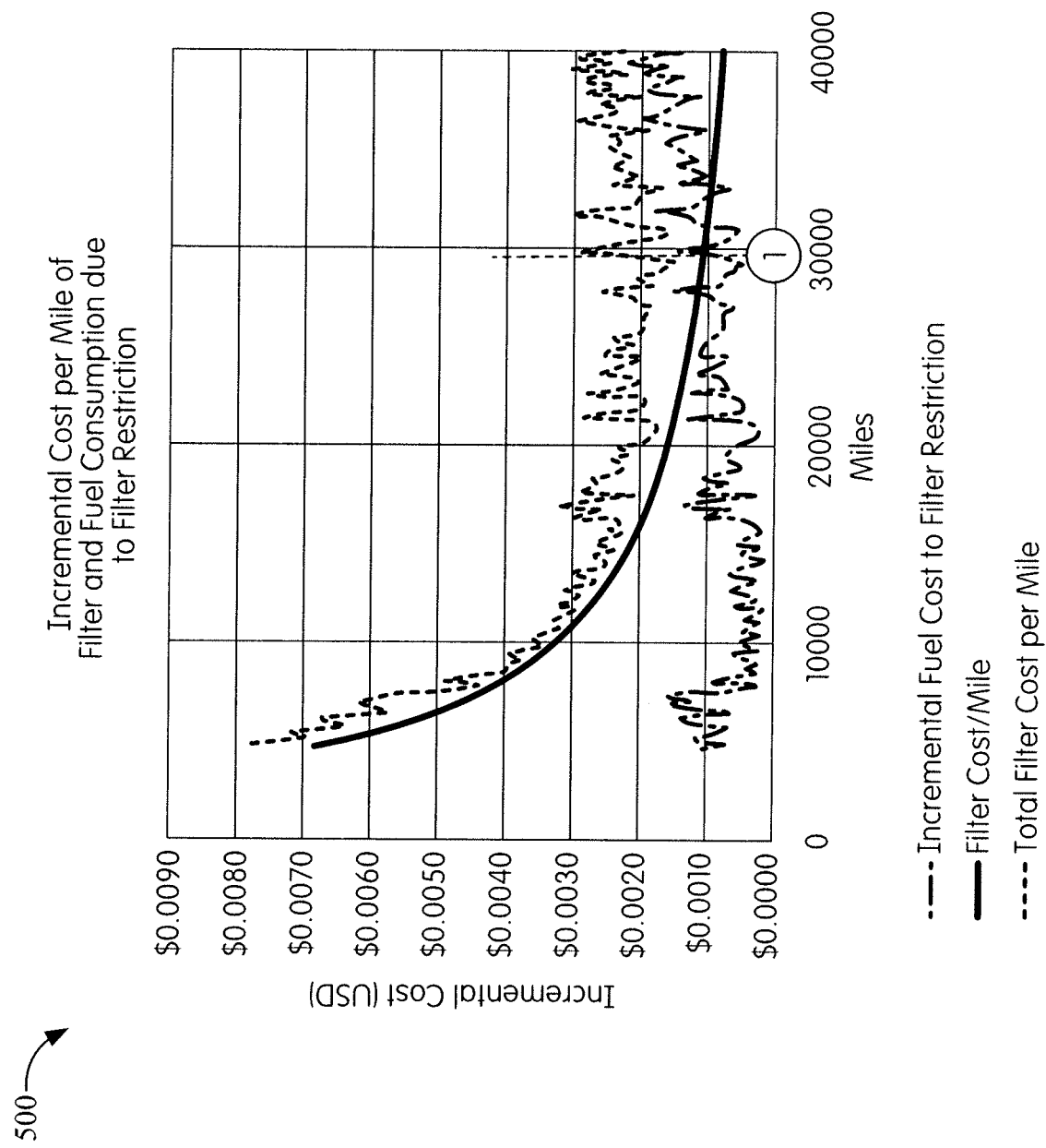
FIG. 5 shows a graph of incremental cost per mile of a filter and fuel consumption due to filter restriction.

Referring to FIG. 5, a graph 500 of incremental cost per mile of a filter and fuel consumption due to filter restriction is shown. The incremental cost is calculated using a $2.00 per gallon cost of fuel and a 6.5 miles-per-gallon fuel economy. The indicated point 1 on the graph 500 indicates the optimum interval to change the filter as being when the cost associated with fuel consumption exceeds the cost per mile associated with the filter purchase price.

Although the above-described systems and methods are described with respect to the lubrication system 104 and the fuel delivery system 106, the system and method can be modified to include other fluid delivery systems. For example, the filter monitoring controller can perform similar analysis on hydraulic filtration systems, air filtration systems, water filtration systems, coolant filtration systems, natural gas delivery systems, diesel emission fluid delivery systems, urea delivery systems, and the like.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps/processes of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps or processes of a depicted method. Additionally, the order in which a particular method occurs may or may not strictly adhere to the order of the corresponding steps or processes shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Some of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the processor 204 of the filter monitoring controller 124. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on a computer (such as via the filter monitoring controller 124 of FIG. 1), partly on the computer, as a stand-alone computer-readable package, partly on the computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   receiving, by a filter monitoring controller, engine operating parameters of an internal combustion engine;
   determining, by the filter monitoring controller, an amount of power generated by the internal combustion engine based at least in part on the engine operating parameters;
   determining, by the filter monitoring controller, a filter hydraulic power consumption of a filtration system providing a fluid to the internal combustion engine;
   determining, by the filter monitoring controller, a fuel economy impact of the filtration system on the internal combustion engine based at least in part on the filter hydraulic power consumption of the filtration system;
   comparing, by the filter monitoring controller, the fuel economy impact of the filtration system to a threshold fuel economy impact to determine whether a filter element of the filtration system requires servicing; and
   generating, by the filter monitoring controller, an alert indicating that the filter element requires servicing in response to the determination that the fuel economy impact of the filtration system is above the threshold fuel economy impact.

2. The method of claim 1, further comprising determining, by the filter monitoring controller, that the fuel economy impact of the filtration system is above the threshold fuel economy impact.

3. The method of claim 2, wherein the generated alert is sent, by the filter monitoring controller, to a user device indicating that the filter element requires servicing in response to the determination that the fuel economy impact of the filtration system is above the threshold fuel economy impact.

4. The method of claim 3, wherein the user device is a dashboard light of a piece of equipment powered by the internal combustion engine.

5. The method of claim 3, wherein the user device is a remote telematics center associated with an operator of the internal combustion engine.

6. The method of claim 1, wherein the filter hydraulic power corresponds to an amount of power used by a pump to drive the fluid through the filtration system.

7. The method of claim 1, wherein the filter monitoring controller is an engine control module that controls the operation of the internal combustion engine.

8. The method of claim 1, wherein the filter monitoring controller receives the engine operating parameters from an engine control module that controls the operation of the internal combustion engine.

9. The method of claim 1, further comprising determining, by the filter monitoring controller, an estimate of fluid flow through the filtration system based at least in part on engine operating parameters.

10. The method of claim 1, further comprising:
    receiving, by a smart filtration controller, collected filtration system information; and
    determining, by the smart filtration controller, that the filter element of the filtration system requires servicing based on the collected filtration system information.

11. The method of claim 10, wherein the collected filtration system information comprises feedback from a first sensor associated with a lubricant filtration system, a second sensor associated with the filtration system, and a third sensor associated with an air filtration system.

12. A filtration system comprising:
    a lubrication system configured to circulate a lubricant to and from an internal combustion engine, the lubrication system comprising:
       a lubricant pump;
       a lubricant sump configured to store lubricant not being circulated through the lubrication system;
       a lubricant filtration system including a lubricant filter element structured to remove contaminants from the lubricant upstream of the internal combustion engine;
    a fuel delivery system configured to deliver fuel to the internal combustion engine, the fuel delivery system comprising:
       a fuel pump;
       a fuel tank configured to store fuel to be combusted by the internal combustion engine;
       a fuel filtration system including a fuel filter element structured to remove contaminants from the fuel upstream of the internal combustion engine; and
    a filter monitoring controller configured to:
       receive engine operating parameters of the internal combustion engine;
       determine an amount of power generated by the internal combustion engine based at least in part on the engine operating parameters;
       determine a filter hydraulic power consumption of the fuel filtration system providing fuel to the internal combustion engine;
       determine a fuel economy impact of the fuel filtration system on the internal combustion engine based at least in part on the filter hydraulic power consumption of the fuel filtration system;
       compare the fuel economy impact of the fuel filtration system to a threshold fuel economy impact to determine whether the fuel filter element requires servicing; and
       generate an alert indicating that the fuel filter element requires servicing in response to the determination that the fuel economy impact of the fuel filtration system is above the threshold fuel economy impact.

13. The filtration system of claim 12, further comprising determining, by the filter monitoring controller, that the fuel economy impact of the fuel filtration system is above the threshold fuel economy impact.

14. The filtration system of claim 13, wherein the filter monitoring controller is further configured to send the generated alert to a user device indicating that the fuel filter element requires servicing.

15. The filtration system of claim 14, wherein the user device is a dashboard light of equipment powered by the internal combustion engine.

16. The filtration system of claim 14, wherein the user device is a remote telematics center associated with an operator of the internal combustion engine.

17. The filtration system of claim 12, wherein the filter monitoring controller is an engine control module that controls the operation of the internal combustion engine.

18. The filtration system of claim 12, wherein the filter monitoring controller receives the engine operating parameters from an engine control module that controls the operation of the internal combustion engine.

19. The filtration system of claim 12 wherein the filter monitoring controller is further configured to determine an estimate of fluid flow through the filtration system based at least in part on the engine operating parameters.

20. The filtration system of claim 12, wherein the filter monitoring controller is further configured to:
   determine a lubricant filter hydraulic power consumption of the lubricant filtration system providing lubricant to the internal combustion engine;
   determine a fuel economy impact of the lubricant filtration system on the internal combustion engine based at least in part on the lubricant filter hydraulic power consumption of the lubricant filtration system; and
   compare the fuel economy impact of the lubricant filtration system to a threshold fuel economy impact to determine whether the lubricant filter element requires servicing.

21. The filtration system of claim 20, wherein the filter monitoring controller is further configured to, in response to, determining that the lubricant filter element requires servicing, initiating an alert to a user device that the filter element requires servicing.

* * * * *